United States Patent
Inui

[11] Patent Number: 5,232,294
[45] Date of Patent: Aug. 3, 1993

[54] RECORDING HEAD DRIVING DEVICE FOR PRINTER

[75] Inventor: Fuyuki Inui, Tokyo, Japan

[73] Assignee: Fuji Photo Film Company Limited, Kanagawa, Japan

[21] Appl. No.: 869,967

[22] Filed: Apr. 17, 1992

[30] Foreign Application Priority Data

Apr. 19, 1991 [JP] Japan .................................. 3-115325

[51] Int. Cl.⁵ .............................................. B41J 2/36
[52] U.S. Cl. ..................................... 400/120; 358/298
[58] Field of Search ........................ 400/120, 120 MT; 346/76 PM; 355/296, 298

[56] References Cited

U.S. PATENT DOCUMENTS

| | | | |
|---|---|---|---|
| 4,745,413 | 5/1988 | Brownstein | 400/120 |
| 4,774,528 | 9/1988 | Kato | 400/120 |
| 4,899,170 | 2/1990 | Izumi | 400/120 |
| 4,928,117 | 5/1990 | Takeuchi | 400/120 |
| 4,951,152 | 8/1990 | Suzuki | 400/120 |

Primary Examiner—David A. Wiecking
Assistant Examiner—Steven S. Kelley

[57] ABSTRACT

A printer has a recording head with a first plurality of recording elements being disposed in a main scan direction. The recording head records the first plurality of pixels on a recording sheet at a time. Each pixel has a second plurality of sub-lines disposed in a sub scan direction, and the number of dot-recorded sub-lines changes with tonal steps. A shift register has the first plurality×8-bit latches for latching sequentially inputted first plurality of image data as parallel data. The M image data are sent via a latch array to a comparator array, and set to respective the first plurality×8-bit magnitude comparators constituting the comparator array. A counter is incremented each time a platen drum holding a recording sheet is rotated by a one sub-line amount, and the position of each sub-line within one pixel is detected. Each 8-bit magnitude comparator maintains each recording element in a conduction enabled state until a count of the counter exceeds the contents of the image data. As a strobe signal is supplied to the gate array during this conduction enabled state, each recording element is powered. In a preferred embodiment, there are provided the first plurality×8-bit counters having a function of presetting a complement of input data and a count function, and an array of the first plurality of decoders. Each decoder maintains each recording element in a conduction enabled state until each 8-bit counter counts up to a maximum count "of the second plurality".

20 Claims, 6 Drawing Sheets

RECORDING HEAD DRIVING DEVICE FOR PRINTER

BACKGROUND OF THE INVENTION

1. Field of the Invention

The present invention relates to a recording head driving device for printers, and more particularly to a driver used for providing a half-tone of in image by changing the length of a dot within one pixel.

2. Description Related to the Related Art

Thermal printers, LCD light printers, and the like use a recording head having M recording elements (M being an integer) disposed in the main scan direction to record M dots on a recording sheet while moving the recording head or recording sheet in the sub scan direction. Thermal printers are used widely nowadays. A known recording head driving device for such thermal printers is structured as having a shift register for shifting sequentially inputted one bit serial signals and converting the one bit serial signals into parallel signals, M latches for latching parallel M signals outputted from the shift register, and M gates for performing a logical multiply between an output signal from each latch and a strobe signal and powering a corresponding thermal element.

Thermal printers used for printing binary images such as characters and lines assign one bit per one pixel. On the other hand, printers used for printing half-tone images of n tonal levels, such as direct imaging type thermal printers and sublimation transfer type thermal printers, assign N bits per one pixel (N being an integer). For example, in order to represent sixty-four tonal levels, eight bits per one pixel are assigned to image data to be expressed by a binary coded hexadecimal notation. A pre-processor converts 8-bit image data into serial 64 binary signals representing an on/off state of each thermal element, and sends the serial 64 binary signals one after another sixty-four times to a recording head driver. For a thermal element recording a maximum density pixel, 64 current pulses are supplied for generating a large thermal energy.

In order to provide a half-tone image, an area gradation method has been proposed. According to this method, one pixel is divided into n sub-lines. Each time a recording head or a recording sheet is moved by one sub-line amount in the sub scan direction, the power conduction time for each recording element is controlled by changing the length of each dot in n steps in the sub scan direction. This area gradation method is effective for a printer which cannot control the density of a dot itself, such as a thermal wax transfer type printer which heats the back of an ink film and transfer melts or softens ink onto a recording sheet.

Printers incorporating such an area gradation method may use the recording head driver described above. However, such a recording head driver transfers data one bit after another, necessitating n times of data transfer for one pixel. Therefore, the data transfer amount proportionally increases as tonal steps increase, which results in a low printing speed. In addition, it is necessary to provide a pre-processor for converting N-bit parallel image data into n serial image data and complicated peripheral circuits.

SUMMARY OF THE INVENTION

It is a principal object of the present invention to provide a recording head driving device for printers capable of performing an area gradation method without lowering a printing speed.

It is another object of the present invention to provide a recording head driving device for printers provided with a simple pre-processor.

In order to achieve the above and other objects, the recording head driver of the present invention has one N-bit parallel shift register (N being an integer), M×N-bit latches (M being an integer), pulse generating means, a counter, M×N-bit magnitude comparators, and M gates. N-bit image data assigned to each pixel is inputted in parallel to the N-bit parallel shift register, shifted each time image data is inputted, and converted into M image data aligned in the main scan direction. The M image data are latched in respective M×N-bit latches. The pulse generating means generates a transport synchronizing pulse each time a recording sheet or a recording head is moved by one sub-line amount in the sub scan direction. The transport synchronizing pulse is counted by the counter to detect the position of a sub-line within one pixel. Each N-bit magnitude comparator compares a count of the counter with each image data latched in the N-bit latch, and continues generating a drive signal until the count of the counter becomes in excess of the contents of the image data latched in the N-bit latch. Each gate controls the power conduction time of each recording element in accordance with the drive signal, for determining the length of a dot in the sub scan direction. N is a number of at least 1, e.g. any one of 1, 2, 4 or 8.

According to a preferred embodiment, the recording head driver has one N-bit parallel shift register constructed of M×N-bit latches, pulse generating means, M counters connected to the M×N-bit latches for presetting with M image data or their complement image data and for counting the transport synchronizing pulse, M decoders for continuing generate the drive signal until the count of each counter becomes in excess of a predetermined value, and M gates.

According to the present invention, the power conduction time of a recording element is controlled by directly using the image data, and allowing data transfer in units of sub-lines within each pixel. Therefore, data transfer time can be considerably shortened to realize high speed printing of a half-tone image of multiple tonal levels. Furthermore, it is unnecessary to provide a pre-processor for converting N-bit parallel image data into n serial data which simplifies the structure and reduces the manufacturing cost of the recording head driving device.

BRIEF DESCRIPTION OF THE DRAWINGS

The above objects and advantages of the present invention will become apparent from the following detailed description of preferred embodiments when read in connection with the accompanying drawings, in which.

DETAILED DESCRIPTION OF THE PREFERRED EMBODIMENTS

Figure 1:
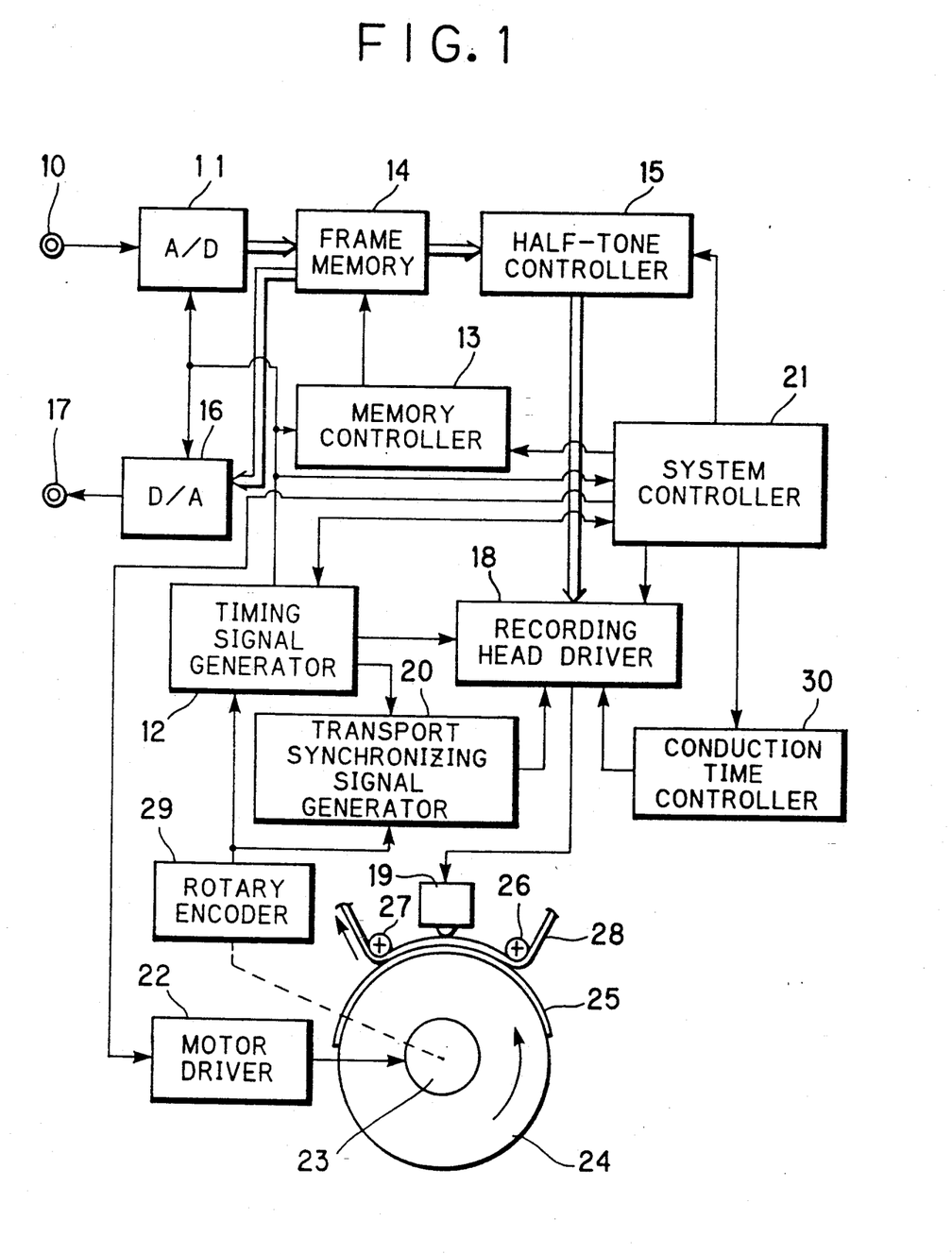
FIG. 1 is a schematic diagram showing a thermal wax transfer type printer.

Referring to FIG. 1, a time sequential image signal is sent to an A/D converter 11 from an input terminal 10, and converted into image data of 8-bit synchronously with timings of sampling signals from a timing signal generator 12. Tonal steps of the 8-bit image data are represented according to binary coded hexadecimal. This 8-bit image data is written in a frame memory 14 controlled by a memory controller 13. The image data is read one line after another from the frame memory 14 and sent to a half-tone controller 15 for printing the image data. The half-tone controller 15 performs half-tone correction of the image data of one line constituted of, for example M pixels (M is an optional integer), while taking ink characteristics and the like into consideration. For monitoring the image, the image data read from the frame memory 14 is converted into analog signals by a D/A converter 16 and sent to a monitor (not shown) via an output terminal 17.

Half-tone corrected M image data are sent to a recording head driver 18 which controls power conduction of each thermal element of a recording head 19. This recording head driver 18 is supplied with clocks from the timing signal generator 12, transport synchronizing signals from a transport synchronizing signal generator 20, latch signals from a system controller 21, and strobe signals from a conduction time controller 30.

Figure 4:
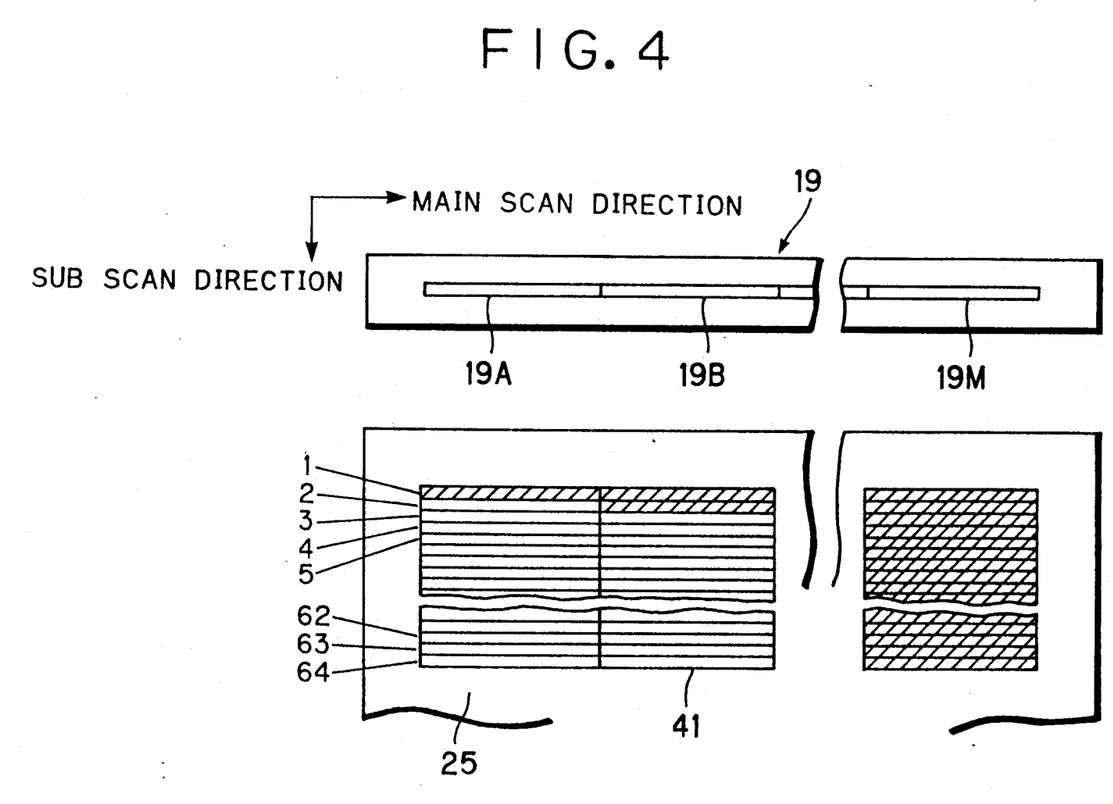
FIG. 4 is a diagram explaining a state of recording by thermal elements.

As shown in FIG. 4, the recording head 19 has M thermal elements 19A to 19M disposed in a main scan direction, each thermal element 19A to 19M being supplied with serial current pulses corresponding in number to the density of each image data. Since the length (width) of each thermal element is as short as 20 μm in the sub scan direction, the thermal element may burn out in a short time because of heat generated by continuous powering. Such burn-out is avoided by driving a thermal element with intermittent current pluses.

A motor driver 22 drives a pulse motor 23 under the control of the system controller 21. The pulse motor 23 rotates a platen drum 24 at a constant pitch, and a recording sheet 25 is wound about the drum 24. An ink film 28, extending between rollers 26 and 27 and in tight contact with the recording sheet 25, moves together with the recording sheet 25, in the sub scan direction indicated by an arrow. As the back surface of the ink film 28 is heated by the recording head 19, melted or softened ink is transferred onto the recording sheet 25. In this embodiment, in order to provide a 64-step-tonal image, the pulse motor 23 moves 64 steps per pixel to cover the length of each pixel 41 in the sub scan direction. At each step, current pulses having a predetermined constant width are supplied to each thermal element. For image data "01h" in the hexadecimal notation, one current pulse having a predetermined width is supplied to the thermal element to record an ink dot only on the first sub-line of its pixel 41. For image data "40h" in the hexadecimal notation, 64 current pulses having the same width are supplied to record ink dots on all 64 sub-lines constituting its pixel 41. No current pulse is supplied as to image data "00h" in the hexadecimal notation, and no ink dot is recorded on any of 64 sub-lines.

The platen drum 24 is coupled to a rotary encoder 29 which generates an encoder pulse each time the platen drum 24 rotates by an amount corresponding to one sub-line. The encoder pulse is supplied to the timing signal generator 12 and the transport synchronizing signal generator 20. Using encoder pulses, the timing signal generator 12 generates a timing signal which is sent to the system controller 21. In response to timing signals, the system controller 21 sequentially controls relevant elements of the printer. The transport synchronizing signal generator 20 generates a transport synchronizing signal each time the encoder pulse is inputted thereto.

Figure 2:
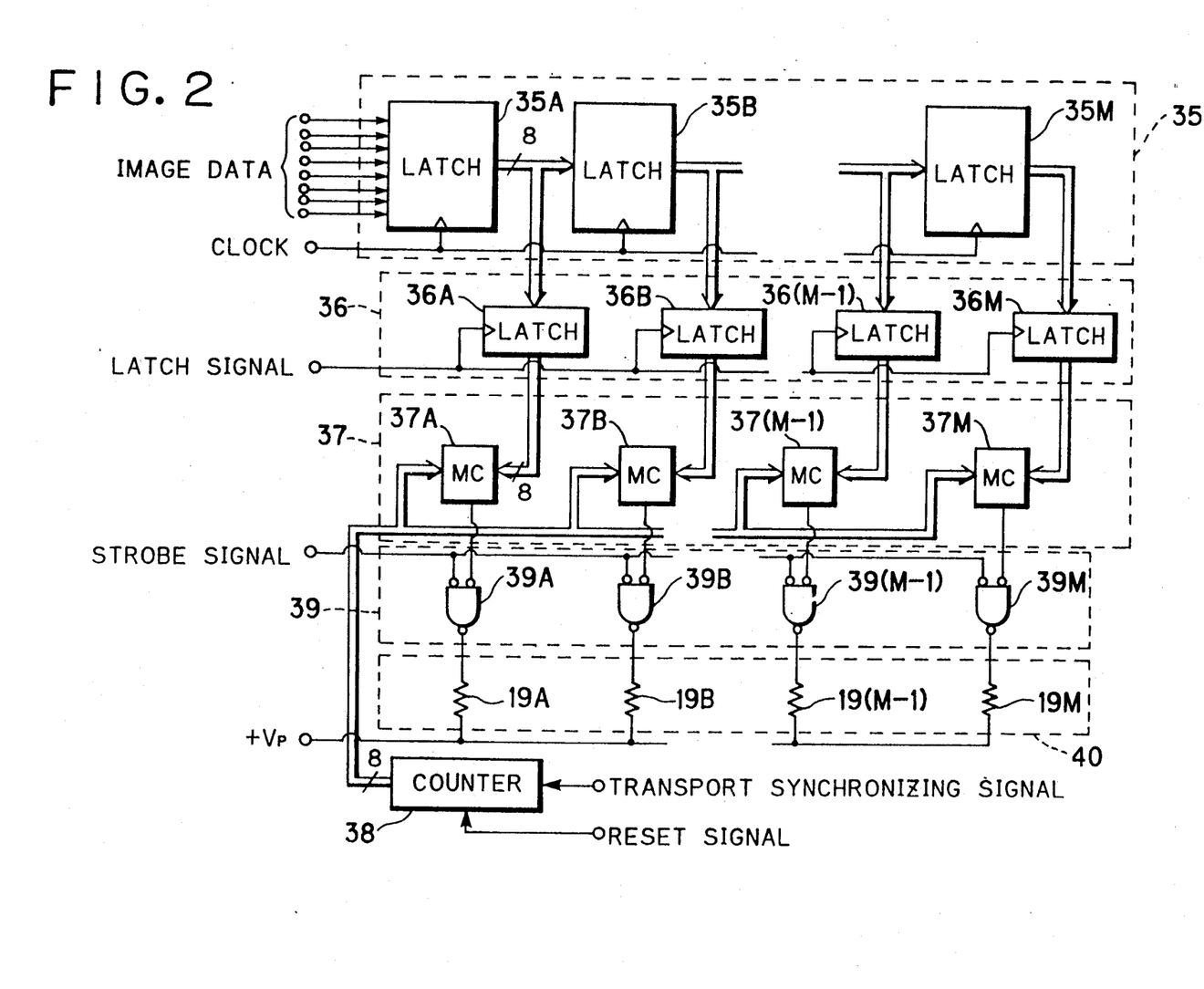
FIG. 2 is a block diagram showing a recording head driver according to an embodiment of the present invention.

FIG. 2 shows the details of the recording head driver 18 for an embodiment of the present invention. A shift register 35 is constructed of serially connected M × 8-bit latches 35A to 35M each having eight input terminals and eight output terminals for parallel input/output of 8-bit image data. M image data of one line in the main scan direction are sequentially inputted to the shift register 35, and shifted synchronously with clocks from the timing signal generator 12.

The shift register 35 is connected to a latch array 36 constructed of M × 8-bit latches 36A to 36M for latching respective image data. The M image data converted into parallel M image data by the shift register 35 are latched by the latch array 36 in response to a latch signal from the system controller 21. The latch array 36 is connected to a comparator array 37 constructed of M × 8-bit magnitude comparators 37A to 37M each outputting a drive signal of level "L" when the count of a counter 38 is smaller than or equal to each image data. The counter 38 supplies binary coded hexadecimal signals.

The counter 38 counts each transport synchronizing signal which is generated every time the recording sheet 25 is moved by one sub-line amount, to thereby identify the position of a present sub-line within the pixel 41. With 64 sub-lines of the one pixel 41, the counter 38 is constructed such that it is reset to an initial value "01h" when 64 ("40h" in hexadecimal notation) transport synchronizing signals have been counted. Immediately prior to the start of printing, the counter 38 is reset to "01h" in response to a reset signal from the system controller 21.

Output terminals of the comparator array 37 are connected to a gate array 39 constructed of M NAND gates 39A to 39M each inputted with an output signal from each comparator and a strobe signal from the conduction time controller 30. When the strobe signal of low level "L" is inputted while the drive signal of low level "L" is supplied from each comparator, an output signal of each NAND gate takes a low level "L". The strobe signal is used to confine the power conduction time of each thermal element, and is generated 64 times in synchronism with the transport synchronizing signal during the recording of one pixel 41.

The gate array 39 is connected to a thermal element array 40 constructed of the M thermal elements 19A to 19M linearly disposed in the main scan direction. Each thermal element 19A to 19M is being powered while a corresponding NAND gate 39A to 39M outputs an "L" signal to heat the back of the ink film 28 and transfer ink dots on to the recording sheet 25.

The operation of this embodiment will be described with reference to FIG. 3. A scanner, video reproducing apparatus, or the like is connected to the input terminal 10 for inputting analog image data to the A/D converter 11. Digital image data converted by the A/D converter 11 is written in the frame memory 14.

In printing image data, the system controller 21 actuates the motor driver 22 to drive the pulse motor 23 and stepwise rotate the platen drum 24 holding a recoding sheet 25. Rotation of the platen drum 24 is detected by the rotary encoder 29 to send the encoder pulse to the timing signal generator 12 and transport synchronizing signal generator 20. The timing signal generator 12 generates a timing signal according to the encoder pulse and sends the timing signal to the system controller 21. Using the timing signal as a reference, the system controller 21 sequentially controls circuit elements of the printer while giving synchronous operations between the elements. In accordance with pulses from the timing signal generator 12 and encoder pulses, the transport synchronizing signal generator 20 generates one transport synchronizing signal each time the platen drum 24 rotates by one sub-line amount, and sends each transport synchronizing signal to the recording head driver 18.

Immediately before the recording sheet 25 reaches the printing start position, the system controller 21 starts an operation of reading M pixel image data in the main scan direction from the frame memory 14. The M image data are sequentially subjected to half-tone correction by the half-tone controller 15, and sent to the shift register 35 of the recording head driver 18. The shift register 35 shifts and latches the M image data in response to clocks from the timing signal generator 12.

The M image data latched in the shift register 35 are latched into the latch array 36 in response to a latch signal from the system controller 21. The M image data latched in the latch array 36 are sent to the comparator array 37 to compare the image data with the count of the hexadecimal counter 38. When the recording sheet 25 reaches the recording start position or the first sub-line of pixels, the system controller 21 sends the reset signal to the counter 38, and count "01h" results on the counter 38.

Figure 3:
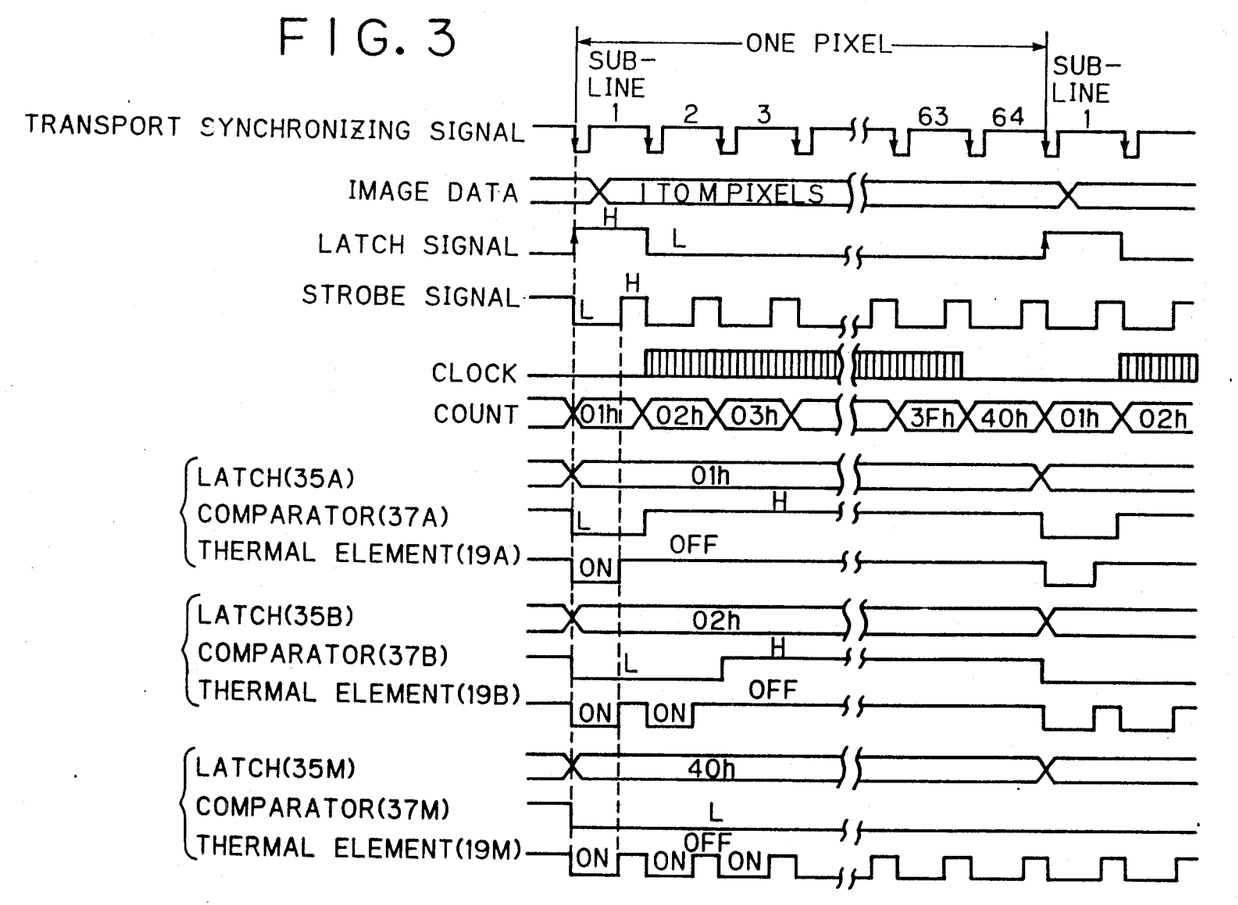
FIG. 3 is a timing chart showing the operation of the recording head driver shown in FIG. 2.

Referring to the timing chart shown in FIG. 3, the image data "01h" is being latched in the latch 36A so that the 8-bit magnitude comparator 37A outputs a signal of "L". In this condition, when the strobe signal of "L" is outputted from the conduction time controller 30, the output of the NAND gate 39A takes a low level "L". Since the thermal element 19A is supplied with a voltage $V_p$ at its one end, current flows toward the NAND gate 39A. The time period while this current flows is confined by the strobe signal, and a current pulse is provided having the constant width to the thermal element 19A.

The thermal element 19A heated by the pulse current heats the back of the ink film 28 to transfer an ink dot on to the recording sheet 25. In this manner, an ink dot is recorded on the first sub-line as shown in FIG. 4. After ink dot transfer, the platen drum 24 further rotates by one sub-line amount. At this time, the thermal element 19A faces on the second sub-line, and the count of the counter 38 is incremented by the transport synchronizing signal to take a value "02h". In this case, the count of the counter 38 is larger than the image data, the output of the 8-bit magnitude comparator 37A takes a signal of "H", and hence the output of the NAND gate 39A takes a signal of "H". Therefore, the thermal element 19A will not be powered even if the second strobe signal is inputted, and an ink dot is only recorded on the first sub-line of the pixel 41.

The image data "02h" is latched in the latch 36B so that the thermal element 19B is powered until the count of the counter 38 exceeds "02h" and the thermal element 19B is heated twice by the first and second strobe signals to record ink dots on the first and second sub-lines. Similarly, the image data "40h" is latched in the latch 36M, so that the thermal element 19M is heated 64 times by the first to sixty-fourth strobe signals to record ink dots on the first to sixty-fourth sub-lines.

As described above, the platen drum 24 rotates 64 steps to move by the amount corresponding to the length of one pixel 41 in the sub scan direction. At each step, current pulses are supplied to each thermal element to record ink dots on sub-lines corresponding in number to its image data. No ink dot is recorded on a pixel 41 for the image data "00h", and ink dots are recorded on all sub-lines of the one pixel 41 for the image data "40h". While recording M pixels on the first line, M pixel image data on the second line are inputted to the 8-bit shift register 35. In this manner, recording of the second line is performed continuously after the completion of recording the first line.

Figure 5:
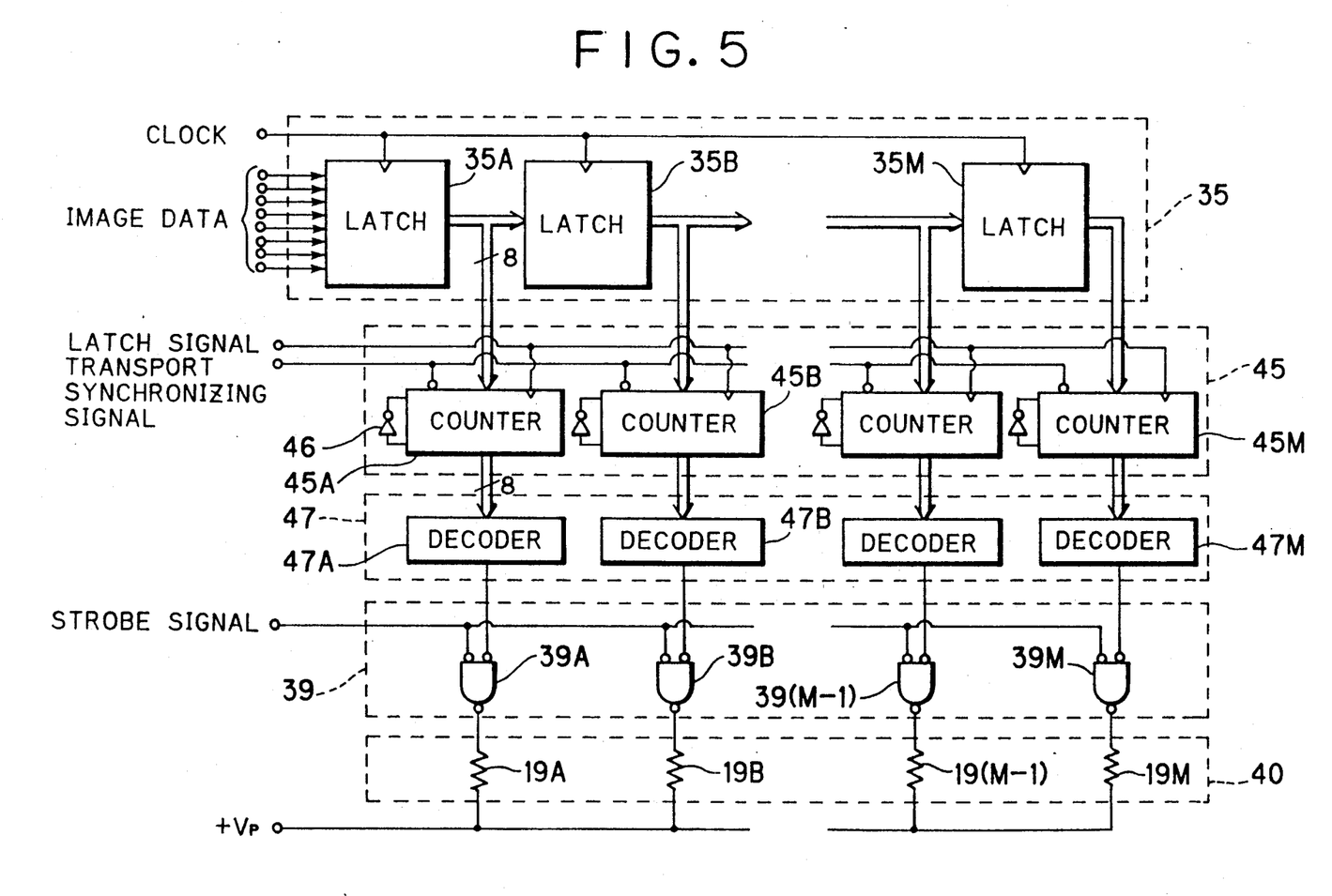
FIG. 5 is a block diagram showing a recording head driver according to another embodiment of the present invention.
Figure 6:
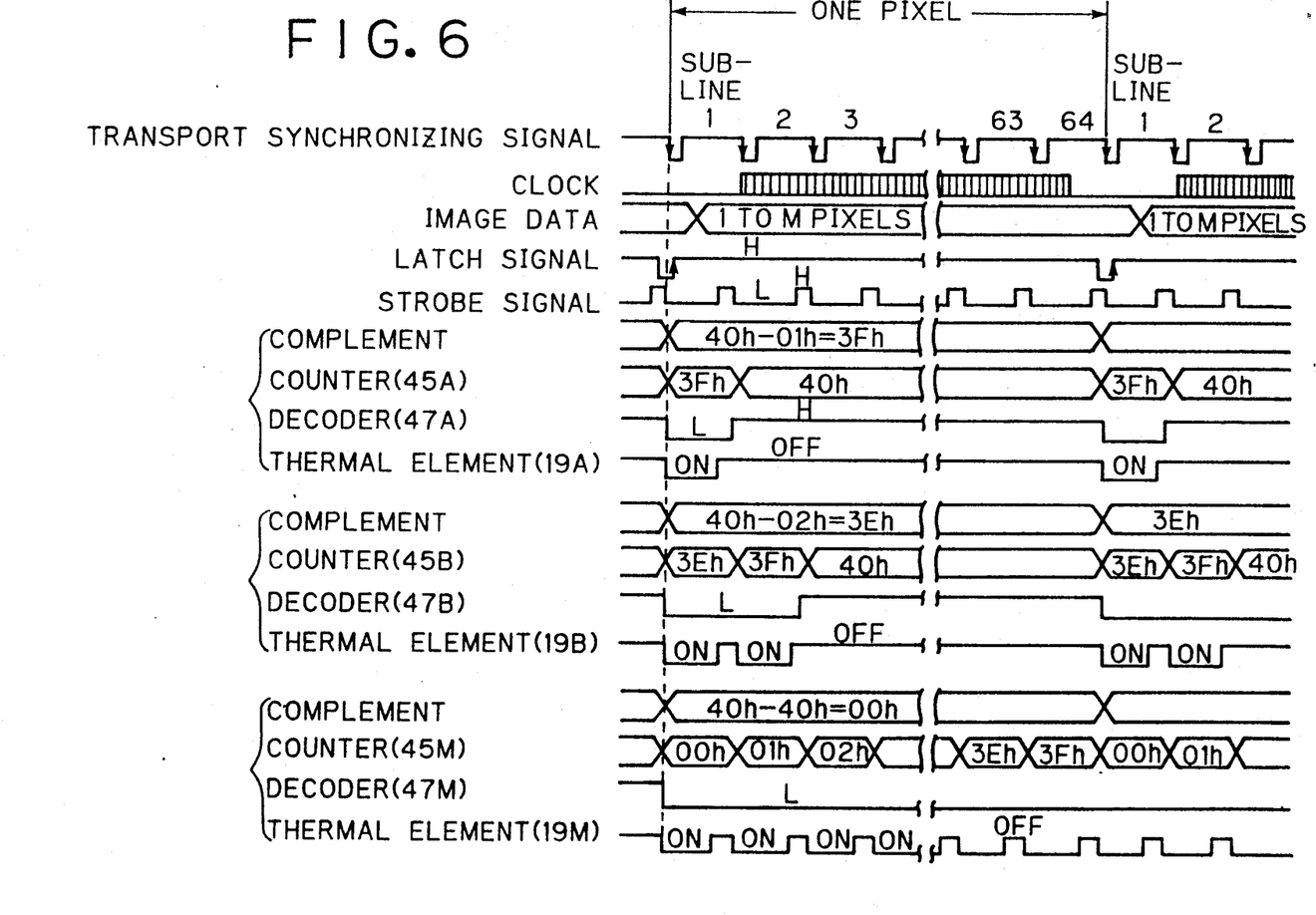
FIG. 6 is a timing chart showing the operation of the recording head driver shown in FIG. 5.

FIGS. 5 and 6 show another embodiment wherein the latch array 36, the comparator array 37, and the counter 38 respectively of the first embodiment, are substituted with a binary coded hexadecimal counter array 45 and a decoder array 47. The counter array 45 is constructed of M×8-bit counters 45A to 45M each having a latch function, a complement converting and presetting function and a count function with an inverter 46 connected across each counter to form a count stop circuit for stopping the count operation. The decoder array 47 is constructed of M decoders 47A to 47M each outputting a high level "H" upon the reception of input data "40h" and a low level "L" upon reception of other image data.

As the timing chart of FIG. 6 shows, the image data "01h" is latched in the latch 35A. When a latch signal is supplied to the 8-bit counter 45A, the complement data "3Fh" of the image data is preset to the 8-bit counter 45A. With the count "3Fh" of the 8-bit counter 45A, the decoder 47A outputs a low level signal "L". As a strobe signal of "L" is inputted in this condition, the thermal element 19A is powered and heated to record an ink dot on the first sub-line.

After recoding an ink dot on the first sub-line, the platen drum 24 is rotated stepwise by one sub-line amount. After this stepwise rotation, the transport synchronizing signal is inputted to the 8-bit counter 45A so that the counter 45A takes a count "40h". The decoder 47A outputs a high level signal "H" so that even if the second and following strobe signals are inputted to the NAND gate 39A, the thermal element 19A is maintained in a turned off condition. When the 8-bit counter 45A takes a count "40h", the count "40h" is decoded and thereafter inverted by the inverter 46 to produce a disable signal, which is inputted to a count enable input terminal to stop the count operation. In this manner, the 8-bit counter 45A holds "40h" until the next complement data is latched.

The image data "02h" is latched in the latch 35B so that the complement data "3Eh" is set to the 8-bit counter 45B in response to the latch signal. Until the 8-bit counter 45B takes a limit count "40h", the 8-bit counter 45B can count two transport synchronizing signals. Therefore, the thermal element 19B is heated twice to record ink dots on the first and second sub-lines. Similarly, the 8-bit counter 45M is allowed to count 64 transport synchronizing signals to record ink dots on all the sub-lines from the first to the sixty-fourth. For the image data "00h", its complement data "40h" is set to the 8-bit counter so that the thermal element will not be heated during the recoding of the pixel 41.

It is to be noted that, instead of converting the image data into complement data to be preset, the image data may be preset in the counters 45A to 45M. In this case, the count in any counter is decremented until "00h" is reached, upon which the thermal element stops being powered.

In the above embodiments, monochrome printing has been given for the description simplicity. The present invention however is applicable to color printing. In printing a color image, a decoder is provided between the input terminal 10 and the A/D converter 11 to separate three color signals from a color video signal. Each color signal is converted into a color digital signal and written to the frame memory 14 provided for each color. In printing a color image, each color image data is read from the frame memory 14 to perform three color frame-sequential recording while rotating the platen drum 24 three times. In color printing, a color ink film is used having cyan ink areas, magenta ink areas, and yellow ink areas cyclically formed.

Furthermore, a line printer incorporating one-dimensional relative motion between a recording sheet and an ink film has been described. The present invention however is also applicable to a serial printer incorporating two-dimensional relative motion. With such a serial printer, a movable recording head is used and a plurality of thermal elements are linearly disposed in the direction of feeding a recording sheet. Therefore, with a serial printer, the direction of feeding a recording sheet and the direction of disposing thermal elements are in the main scan direction, and the direction of moving a recording head is in the sub scan direction.

The present invention is also applicable to other printers for printing an half-tone image by a area gradation method, such as sublimation transfer type thermal printers, direct imaging type thermal printers, and LCD light printers. Still further, one current pulse is used for recording one sub-line in the above embodiments. Instead, a plurality of current pulses may be supplied to a thermal element to record one sub-line while providing a plurality of strobe signals. Still further, the transport synchronizing signal generator generates a transport synchronizing signal each time a recording sheet or recording head moves by a predetermined amount. Instead of the pulse motor, a DC motor may be alternatively used, and may cause the platen drum to rotate continuously.

Various changes and modifications to the illustrative embodiments described above will be apparent to those skilled in the art. These changes and modifications can be made without departing form the spirit and the scope of the invention and without diminishing its attendant advantages. It is therefore intended that such changes and modifications be covered by the following claims.

I claim:

1. A recording head driving device for a printer having a recording head with a first plurality of recording elements, said first plurality being an integer, disposed in a main scan direction for recording said first plurality of pixels on a recording sheet at a time, one of said pixels being constituted by a second plurality of sub-lines, said second plurality being an integer, and a half-tone being produced by changing the number of said sub-lines where a dot is recorded in accordance with a tonal step, said recording head driving device comprising:

an N-bit parallel shift register, N being an integer, for shifting N-bit image data and converting sequentially said first plurality of said N-bit image data inputted thereto into parallel data;

said first plurality of N-bit latches connected to said N-bit parallel shift register, for latching said first plurality of said N-bit image data;

pulse generating means for generating a transport synchronizing pulse each time that said recording sheet or said recording head moves by one sub-line amount in a sub scan direction perpendicular to said main scan direction;

a counter for counting said transport synchronizing pulse and detecting the position of said sub-line within said one pixel, said counter being reset at one time for one pixel;

said first plurality of N-bit magnitude comparators for comparing a count of said counter with said image data latched in each of said N-bit latches, in order to generate a drive signal until the count of said counter exceeds said image data; and said first plurality of gates for controlling power conduction of each of said recording elements, each of said first plurality of gates being supplied with said drive signal and being opened and closed at a period of each of said sub-lines.

2. A recording head driving device according to claim 1, wherein said recording elements comprise thermal elements.

3. A recording head driving device according to claim 2, further comprising a platen drum for holding said recording sheet, and a motor for rotating said platen drum.

4. A recording head driving device according to claim 3, wherein said printer is a thermal wax transfer type printer wherein each of said thermal elements heats the back surface of an ink ribbon to transfer ink onto said recording sheet.

5. A recording head driving device according to claim 4, wherein each of said gates is inputted with a strobe signal in addition to said drive signal, said strobe signal determining the recording time period for each said sub-line.

6. A recording head driving device according to claim 5, wherein said N-bit parallel shift register includes said first plurality of N-bit latches.

7. A recording head driving device according to claim 6, wherein said gates comprise NAND gates.

8. A recording head driving device according to claim 7, wherein each of said thermal elements is connected to an output terminal of a corresponding one of said NAND gates.

9. A recording head driving device according to claim 8, wherein said N-bit comprises 8 bits, and said second plurality of sub-lines comprises 64 sub-lines.

10. A recording head driving device for a printer having a recording head with a first plurality of recording elements, said first plurality being an integer, disposed in a main scan direction for recording said first plurality of pixels on a recording sheet at a time, one of said pixels being constituted by a second plurality of sub-lines, said second plurality being an integer, and a half-tone being produced by changing the number of said sub-lines where a dot is recorded in accordance with a tonal step, said recording head driving device comprising:
- an N-bit parallel shift register, N being an integer, for shifting N-bit image data and converting sequentially said first plurality of said N-bit image data inputted thereto into parallel data;
- pulse generating means for generating a transport synchronizing pulse each time that said recording sheet or said recording head moves by one sub-line amount in a sub scan direction perpendicular to said main scan direction;
- said first plurality of counters connected to said N-bit parallel shift register for presetting said first plurality of image data or complements of said first plurality of image data, and counting said transport synchronizing pulse;
- said first plurality of decoders for continuing to generate a drive signal until the count of said counters exceeds a predetermined value; and
- said first plurality of gates for controlling power conduction of each of said recording elements, each of said first plurality of gates being supplied with said drive signal and being opened and closed at a period of each of said sub-lines.

11. A recording head driving device according to claim 10, wherein said recording elements comprise thermal elements.

12. A recording head driving device according to claim 11, further comprising a platen drum for holding said recording sheet, and a motor for rotating said platen drum.

13. A recording head driving device according to claim 12, wherein said printer is a thermal wax transfer type printer wherein each of said thermal elements heat the back surface of an ink ribbon to transfer ink onto said recording sheet.

14. A recording head driving device according to claim 13, wherein each of said gates is inputted with a strobe signal in addition to said drive signal, said strobe signal determining the recording time period for each said sub-line.

15. A recording head driving device according to claim 14, wherein said N-bit parallel shift register includes said first plurality of N-bit latches.

16. A recording head driving device according to claim 15, wherein said gates comprise NAND gates.

17. A recording head driving device according to claim 16, wherein each of said thermal elements is connected to an output terminal of a corresponding one of said NAND gates.

18. A recording head driving device according to claim 17, wherein said N-bit comprises 8 bits, and said second plurality of sub-lines comprises 64 sub-lines.

19. A method for providing a half-tone of an image by a recording head driving device for a printer having a recording head with a first plurality of recording elements, said first plurality being an integer, disposed in a main scan direction for recording said first plurality of pixels on a recording sheet at a time, one of said pixels being constituted by a second plurality of sub-lines, said second plurality being an integer, and said half-tone being produced by changing the number of said sub-lines where a dot is recorded in accordance with a tonal step, said method comprising the steps of:
- (a) shifting N-bit image data and converting sequentially said first plurality of said N-bit image data inputted thereto into parallel data by an N-bit parallel shift register, N being an integer;
- (b) latching said first plurality of said N-bit image data by said first plurality of N-bit latches connected to said N-bit parallel shift register;
- (c) generating a transport synchronizing pulse each time that said recording sheet or said recording head moves by one sub-line amount in a sub scan direction perpendicular to said main scan direction;
- (d) counting said transport synchronizing pulse and detecting the position of said sub-line within said one pixel by a counter which is reset one time for one pixel;
- (e) comparing a count of said counter with said image data latched in each of said N-bit latches and generating a drive signal until the count of said counter exceeds said image data by said first plurality of N-bit magnitude comparators; and
- (f) controlling power conduction of each of said recording elements by said first plurality of gates which are each supplied with said drive signal and are opened and closed at a period of each of said sub-lines.

20. A method for providing a half-tone of an image by a recording head driving device for a printer having a recording head with a first plurality of recording elements, said first plurality being an integer, disposed in a main direction for recording said first plurality of pixels on a recording sheet at a time, one of said pixels being constituted by a second plurality of sub-lines, said second plurality being an integer, and said half-tone being produced by changing the number of said sub-lines where a dot is recorded in accordance with a tonal step, said method comprising the steps of:
- (a) shifting N-bit image data and converting sequentially said first plurality of said N-bit image data inputted thereto into parallel data by an N-bit parallel shift register, N being an integer;
- (b) generating a transport synchronizing pulse each time that said recording sheet or said recording head moves by one sub-line amount in a sub scan direction perpendicular to said main scan direction;
- (c) presetting said first plurality of image data or complements of said first plurality of image data and counting said transport synchronizing pulse by said first plurality of counters connected to said N-bit parallel shift register;
- (d) continuing to generate a drive signal until the count of said counters exceeds a predetermined value by said first plurality of decoders; and
- (e) controlling power conduction of each of said recording elements by said first plurality of gates which are each supplied with said drive signal and are opened and closed at a period of each of said sub-lines.

* * * * *